United States Patent
Gribble

(10) Patent No.: US 7,720,506 B1
(45) Date of Patent: May 18, 2010

(54) SYSTEM AND METHOD OF PROVIDING ANTENNA SPECIFIC FRONT ENDS FOR AVIATION SOFTWARE DEFINED RADIOS

(75) Inventor: David A. Gribble, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 676 days.

(21) Appl. No.: 11/495,361

(22) Filed: Jul. 28, 2006

(51) Int. Cl.
H04M 1/00 (2006.01)
H04B 1/38 (2006.01)

(52) U.S. Cl. ............. 455/552.1; 455/553.1; 455/562.1; 455/90.2; 455/132; 455/277.1

(58) Field of Classification Search ............... 455/550, 455/552.1, 553.1, 562.1, 90.1, 90.2, 121, 455/193.1, 275
See application file for complete search history.

(56) References Cited

U.S. PATENT DOCUMENTS

| | | | |
|---|---|---|---|
| 5,020,135 A | 5/1991 | Kasparian et al. | |
| 5,197,084 A | 3/1993 | Fuhrman | |
| 5,302,947 A | 4/1994 | Fuller et al. | |
| 5,404,392 A | 4/1995 | Miller et al. | |
| 5,448,765 A | 9/1995 | Kovanen et al. | |
| 5,488,356 A | 1/1996 | Martinovich et al. | |
| 5,668,591 A | 9/1997 | Shintani | |
| 5,781,865 A * | 7/1998 | Gammon | 455/561 |
| 5,801,690 A | 9/1998 | Ayoub et al. | |
| 5,854,986 A * | 12/1998 | Dorren et al. | 455/562.1 |
| 5,896,562 A * | 4/1999 | Heinonen | 455/76 |
| 5,999,815 A * | 12/1999 | TenBrook et al. | 455/436 |
| 6,034,623 A | 3/2000 | Wandel | |
| 6,052,600 A | 4/2000 | Fette et al. | |
| 6,070,090 A * | 5/2000 | Feuerstein | 455/561 |
| 6,181,734 B1 | 1/2001 | Palermo | |
| 6,188,898 B1 * | 2/2001 | Phillips | 455/433 |
| 6,242,919 B1 | 6/2001 | Zuk et al. | |
| 6,272,457 B1 | 8/2001 | Ford et al. | |
| 6,279,019 B1 | 8/2001 | Oh et al. | |
| 6,279,153 B1 | 8/2001 | Bi et al. | |
| 6,331,834 B1 | 12/2001 | Smith | |
| 6,342,869 B1 | 1/2002 | Edvardsson et al. | |
| 6,353,846 B1 | 3/2002 | Fleeson | |
| 6,452,325 B1 | 9/2002 | Dupont | |

(Continued)

FOREIGN PATENT DOCUMENTS

EP 0510322 10/1992

(Continued)

*Primary Examiner*—Duc M Nguyen
(74) *Attorney, Agent, or Firm*—Matthew J. Evans; Daniel M. Barbieri

(57) ABSTRACT

A software defined radio system is described. The software defined radio comprises a modem bank at least partially defined by software running on a processor. The SDR also comprises an antenna group translator coupled to the modem bank. Further, the SDR comprises at least one antenna coupled to the antenna group translator. The antenna group translator comprises an antenna switch comprising RF filtering functions and RF front ends comprising frequency conversion functions. To greatly reduce the complexity and cost of the system, the architecture includes an antenna group translator having RF front end hardware that is specific to the frequency band of each antenna. In addition, the modem bank includes banded frequency converters.

20 Claims, 3 Drawing Sheets

U.S. PATENT DOCUMENTS

| | | |
|---|---|---|
| 6,463,089 B1 | 10/2002 | Chauncey et al. |
| 6,516,204 B1 | 2/2003 | Funk et al. |
| 6,522,307 B2 * | 2/2003 | Kim ........................ 343/850 |
| 6,529,736 B1 | 3/2003 | Kopetzky |
| 6,535,748 B1 * | 3/2003 | Vuorio et al. ............ 455/552.1 |
| 6,549,067 B1 | 4/2003 | Kenington |
| 6,556,099 B2 | 4/2003 | Khan et al. |
| 6,591,084 B1 | 7/2003 | Chuprun et al. |
| 6,609,039 B1 | 8/2003 | Schoen |
| 6,614,307 B1 | 9/2003 | Zhao et al. |
| 6,636,747 B2 * | 10/2003 | Harada et al. ............ 455/552.1 |
| 6,667,708 B2 | 12/2003 | Schooler et al. |
| 6,671,509 B1 | 12/2003 | Tanaka et al. |
| 6,681,989 B2 | 1/2004 | Bodin |
| 6,687,901 B1 | 2/2004 | Imamatsu |
| 6,708,879 B2 | 3/2004 | Hunt |
| 6,728,517 B2 * | 4/2004 | Sugar et al. .................. 455/73 |
| 6,751,470 B1 * | 6/2004 | Ella et al. ................ 455/552.1 |
| 6,768,435 B2 | 7/2004 | Xu |
| 6,785,255 B2 | 8/2004 | Sastri et al. |
| 6,792,273 B1 | 9/2004 | Tellinger et al. |
| 6,795,444 B1 | 9/2004 | Vo et al. |
| 6,801,788 B1 | 10/2004 | Csapo et al. |
| 6,804,520 B1 | 10/2004 | Johansson et al. |
| 6,807,165 B2 | 10/2004 | Belcea |
| 6,823,181 B1 | 11/2004 | Kohno et al. |
| 6,825,766 B2 | 11/2004 | Hewitt et al. |
| 6,873,839 B2 | 3/2005 | Stanforth |
| 6,914,950 B1 | 7/2005 | Luneau |
| 6,931,074 B1 * | 8/2005 | Palermo et al. .............. 375/259 |
| 6,968,155 B1 | 11/2005 | Palicot et al. |
| 6,975,849 B1 | 12/2005 | DeVries |
| 6,983,174 B2 * | 1/2006 | Hoppenstein et al. .... 455/562.1 |
| 7,003,314 B1 | 2/2006 | Iselt |
| 7,043,270 B2 * | 5/2006 | Judd et al. .................. 455/561 |
| 7,116,958 B1 * | 10/2006 | Brown et al. ................ 455/266 |
| 7,151,925 B2 * | 12/2006 | Ting et al. ................... 455/418 |
| 7,155,252 B2 * | 12/2006 | Martin et al. ............. 455/553.1 |
| 7,187,945 B2 * | 3/2007 | Ranta et al. .............. 455/552.1 |
| 7,203,488 B2 * | 4/2007 | Luneau .................... 455/422.1 |
| 7,212,788 B2 | 5/2007 | Weber et al. .................. 455/78 |
| 7,251,459 B2 * | 7/2007 | McFarland et al. .......... 455/101 |
| 7,512,103 B1 * | 3/2009 | Snodgrass ................... 370/337 |
| 2001/0037259 A1 | 11/2001 | Sharma et al. |
| 2002/0009161 A1 | 1/2002 | Ratni et al. |
| 2002/0016183 A1 * | 2/2002 | Lehtinen ..................... 455/553 |
| 2002/0028655 A1 | 3/2002 | Rosener et al. |
| 2002/0041639 A1 | 4/2002 | Krupezevic et al. |
| 2002/0072326 A1 | 6/2002 | Qureshey et al. |
| 2002/0082044 A1 | 6/2002 | Davenport |
| 2002/0098864 A1 | 7/2002 | Mukai et al. |
| 2002/0131480 A1 | 9/2002 | Sousa et al. |
| 2002/0137514 A1 | 9/2002 | Mitsugi et al. |
| 2002/0144134 A1 | 10/2002 | Watanabe et al. |
| 2002/0151298 A1 | 10/2002 | Muhonen |
| 2002/0160765 A1 | 10/2002 | Okajima |
| 2003/0023761 A1 | 1/2003 | Jeansonne et al. |
| 2003/0026200 A1 | 2/2003 | Fu et al. |
| 2003/0028787 A1 | 2/2003 | Fayed et al. |
| 2003/0039214 A1 | 2/2003 | Huffman |
| 2003/0040282 A1 | 2/2003 | Park |
| 2003/0048762 A1 | 3/2003 | Wu et al. |
| 2003/0050055 A1 | 3/2003 | Ting et al. |
| 2003/0050073 A1 | 3/2003 | Wasko |
| 2003/0067902 A1 | 4/2003 | Skeba |
| 2003/0079048 A1 | 4/2003 | Kim |
| 2003/0081580 A1 | 5/2003 | Vaidyanathan et al. |
| 2003/0083055 A1 | 5/2003 | Riordan et al. |
| 2003/0143988 A1 | 7/2003 | Jamadagni |
| 2003/0158954 A1 | 8/2003 | Williams |
| 2003/0163551 A1 | 8/2003 | Riordan |
| 2003/0174731 A1 | 9/2003 | Tafazolli et al. |
| 2003/0216927 A1 | 11/2003 | Sridhar et al. |
| 2004/0005910 A1 | 1/2004 | Tom |
| 2004/0022332 A1 | 2/2004 | Gupta et al. |
| 2004/0029545 A1 | 2/2004 | Anderson et al. |
| 2004/0048608 A1 | 3/2004 | Matsuo et al. |
| 2004/0052372 A1 * | 3/2004 | Jakoubek ..................... 380/255 |
| 2004/0063425 A1 | 4/2004 | Wakutsu et al. |
| 2004/0105533 A1 | 6/2004 | Iseli |
| 2004/0127202 A1 | 7/2004 | Shih et al. |
| 2004/0128133 A1 | 7/2004 | Sacks et al. |
| 2004/0128134 A1 | 7/2004 | Sacks et al. |
| 2004/0128200 A1 | 7/2004 | Sacks et al. |
| 2004/0132500 A1 | 7/2004 | Rogalski et al. |
| 2004/0136452 A1 | 7/2004 | Feldman et al. |
| 2004/0138781 A1 | 7/2004 | Sacks et al. |
| 2004/0143652 A1 | 7/2004 | Grannan et al. |
| 2004/0153957 A1 | 8/2004 | Feldman et al. |
| 2004/0161062 A1 | 8/2004 | Richey et al. |
| 2004/0162107 A1 * | 8/2004 | Klemetti et al. .......... 455/553.1 |
| 2004/0185805 A1 | 9/2004 | Kim et al. |
| 2004/0203709 A1 | 10/2004 | Luneau |
| 2004/0203733 A1 | 10/2004 | Collum et al. |
| 2004/0203837 A1 | 10/2004 | Lawrence |
| 2004/0215753 A1 | 10/2004 | Chan et al. |
| 2004/0224647 A1 | 11/2004 | Ma et al. |
| 2004/0242236 A1 | 12/2004 | Inagaki |
| 2004/0242261 A1 | 12/2004 | Fette |
| 2005/0007988 A1 | 1/2005 | Ferris et al. |
| 2005/0008098 A1 | 1/2005 | Iancu et al. |
| 2005/0020298 A1 * | 1/2005 | Masumoto et al. ........ 455/552.1 |
| 2005/0024927 A1 | 2/2005 | Dolwin |
| 2005/0025170 A1 | 2/2005 | Po et al. |
| 2005/0027789 A1 | 2/2005 | Luo et al. |
| 2005/0032480 A1 * | 2/2005 | Lee et al. ....................... 455/76 |
| 2005/0041746 A1 | 2/2005 | Rosen et al. |
| 2005/0057578 A1 | 3/2005 | Chen et al. |
| 2005/0059427 A1 | 3/2005 | Wallace |
| 2005/0079847 A1 * | 4/2005 | Arafa .......................... 455/272 |
| 2005/0079890 A1 | 4/2005 | Yu |
| 2005/0108382 A1 | 5/2005 | Murotake et al. |
| 2005/0124330 A1 | 6/2005 | Hong et al. |
| 2005/0143005 A1 | 6/2005 | Moore, III |
| 2005/0157677 A1 | 7/2005 | Dowling |
| 2005/0160124 A1 | 7/2005 | Bisiaux |
| 2005/0250468 A1 * | 11/2005 | Lu et al. ...................... 455/403 |
| 2006/0063493 A1 * | 3/2006 | Yanduru et al. ............... 455/77 |
| 2006/0178122 A1 * | 8/2006 | Srinivasan et al. ......... 455/168.1 |
| 2007/0105587 A1 * | 5/2007 | Lu ........................... 455/552.1 |

FOREIGN PATENT DOCUMENTS

| | | |
|---|---|---|
| EP | 0675661 | 10/1995 |
| EP | 0684743 | 11/1995 |
| EP | 0785694 | 1/1997 |
| EP | 0943928 | 9/1999 |
| EP | 1225775 | 1/2001 |
| EP | 1283994 | 5/2001 |
| EP | 1335289 | 2/2002 |
| EP | 1401224 | 9/2002 |
| EP | 1263249 | 12/2002 |
| EP | 1437667 | 12/2002 |
| EP | 1352788 | 3/2003 |
| EP | 1302088 | 4/2003 |
| EP | 1528723 | 10/2003 |
| EP | 1557743 | 1/2005 |
| JP | 6252916 | 9/1994 |
| JP | 8079379 | 3/1996 |
| JP | 9224271 | 8/1997 |
| JP | 10075206 | 3/1998 |
| JP | 11055178 | 2/1999 |
| JP | 11088508 | 3/1999 |
| JP | 11220422 | 8/1999 |

| | | | | | |
|---|---|---|---|---|---|
| JP | 11275171 | 10/1999 | JP | 2004023753 | 1/2004 |
| JP | 11341539 | 12/1999 | JP | 2004120650 | 4/2004 |
| JP | 11346186 | 12/1999 | JP | 2004135221 | 4/2004 |
| JP | 2000032154 | 1/2000 | JP | 2004153659 | 5/2004 |
| JP | 2000236268 | 8/2000 | JP | 2004153661 | 5/2004 |
| JP | 2000308135 | 11/2000 | JP | 2004153662 | 5/2004 |
| JP | 2000324043 | 11/2000 | JP | 2004153663 | 5/2004 |
| JP | 2001016355 | 1/2001 | JP | 2004201024 | 7/2004 |
| JP | 2001044882 | 2/2001 | JP | 2004213339 | 7/2004 |
| JP | 2001045566 | 2/2001 | JP | 2004240869 | 8/2004 |
| JP | 2001045567 | 2/2001 | JP | 2004253993 | 9/2004 |
| JP | 2001061186 | 3/2001 | JP | 2004260513 | 9/2004 |
| JP | 2001075717 | 3/2001 | JP | 2004272789 | 9/2004 |
| JP | 2001094445 | 4/2001 | JP | 2004274300 | 9/2004 |
| JP | 2001101005 | 4/2001 | JP | 2004297357 | 10/2004 |
| JP | 2001189700 | 7/2001 | JP | 2004326689 | 11/2004 |
| JP | 2001256052 | 9/2001 | JP | 2004334735 | 11/2004 |
| JP | 2001285175 | 10/2001 | JP | 2004334736 | 11/2004 |
| JP | 2001285179 | 10/2001 | JP | 2004343500 | 12/2004 |
| JP | 2001308730 | 11/2001 | JP | 2005039557 | 2/2005 |
| JP | 2001356979 | 12/2001 | WO | WO 93/17530 | 2/1993 |
| JP | 2002064399 | 2/2002 | WO | WO 97/08838 | 3/1997 |
| JP | 2002064451 | 2/2002 | WO | WO 97/15161 | 4/1997 |
| JP | 2002076979 | 3/2002 | WO | WO 00/41407 | 1/2000 |
| JP | 2002132400 | 5/2002 | WO | WO 00/74412 | 5/2000 |
| JP | 2002135276 | 5/2002 | WO | WO 01/10050 | 2/2001 |
| JP | 2002141823 | 5/2002 | WO | WO 01/72058 | 3/2001 |
| JP | 2002204273 | 7/2002 | WO | WO 02/59752 | 1/2002 |
| JP | 2002261723 | 9/2002 | WO | WO 0201740 | 1/2002 |
| JP | 2002269473 | 9/2002 | WO | WO 02/15419 | 2/2002 |
| JP | 2002300071 | 10/2002 | WO | WO 02/30141 | 4/2002 |
| JP | 2002300664 | 10/2002 | WO | WO 02009164 | 11/2002 |
| JP | 2002368543 | 12/2002 | WO | WO 03/017706 | 2/2003 |
| JP | 2003044301 | 2/2003 | WO | WO 2004/008719 | 1/2004 |
| JP | 2003078475 | 3/2003 | WO | WO2004064271 | 7/2004 |
| JP | 2003101474 | 4/2003 | WO | WO 2004074975 | 9/2004 |
| JP | 2003116040 | 4/2003 | WO | WO 2005/004513 | 1/2005 |
| JP | 2003174404 | 6/2003 | WO | WO 2005/013540 | 2/2005 |
| JP | 2003198450 | 7/2003 | WO | WO2005011185 | 2/2005 |
| JP | 2003218731 | 7/2003 | WO | WO 2005/029808 | 3/2005 |
| JP | 2003219464 | 7/2003 | WO | WO 2005/032099 | 4/2005 |
| JP | 2003304235 | 10/2003 | WO | WO 2005/043930 | 5/2005 |
| JP | 2003318802 | 11/2003 | WO | WO 2005/065098 | 7/2005 |
| JP | 2003333663 | 11/2003 | | | |
| JP | 2003338799 | 11/2003 | | * cited by examiner | |

SYSTEM AND METHOD OF PROVIDING ANTENNA SPECIFIC FRONT ENDS FOR AVIATION SOFTWARE DEFINED RADIOS

BACKGROUND

The invention described herein generally relates to Software Defined Radios (SDR) and SDR systems. In particular, a system and method of providing antenna specific front ends for software defined radios is described.

Software Defined Radio methodology is rapidly gaining favor as a way to architect and design radio communication systems with greatly improved interoperability and ability to accommodate future waveform variants. SDR refers to wireless communication in which the transmitter modulation is generated or defined by a computer, and the receiver uses a computer to recover the signal intelligence. To select the desired modulation type, the proper programs are run by microcomputers that control the transmitter and receiver.

A conventional voice SDR transmitter, such as may be used in mobile two-way radio or cellular telephone communication, include the following stages: Microphone; Audio amplifier; Analog-to-digital converter (ADC) that converts the voice audio to digital data; Modulator that impresses the digital intelligence onto a radio-frequency (RF) carrier; Series of amplifiers that boosts the RF carrier to the power level necessary for transmission; and Transmitting antenna. Conventionally, the ADC and Modulator functions are carried out by computer-controlled circuits whose parameters are determined by software, in an SDR.

A conventional receiver designed to intercept the above-described voice SDR signal may employ the following stages, essentially reversing the transmitter's action: Receiving antenna; Superheterodyne system that boosts incoming RF signal strength and converts it to a lower frequency; Demodulator that separates the digital intelligence from the RF carrier; Digital-to-analog converter (DAC) that generates a voice waveform from the digital data; Audio amplifier; and Speaker, earphone, and/or headset. Conventionally, the demodulator and DAC functions are carried out by computer-controlled circuits whose parameters are determined by software, in an SDR.

The most significant asset of SDR is versatility. Wireless systems employ protocols that vary from one service to another. Even in the same type of service, for example, cellular telephones, the protocol often differs from country to country. A single SDR set with an all-inclusive software repertoire may be used in any mode, anywhere in the world. Changing the service type, the mode, and/or the modulation protocol involves simply selecting and executing the requisite computer program. The ultimate goal of SDR engineers is to provide a single radio transceiver capable of playing the roles of cordless telephone, cell phone, wireless fax, wireless e-mail system, pager, wireless videoconferencing unit, wireless Web browser, Global Positioning System (GPS) unit, and other functions to be later developed, operable from any location on the surface or proximate the surface of the earth, and perhaps in space as well.

The United States Department of Defense (DoD) Joint Tactical Radio System (JTRS) initiative has established an Open Standard Architecture for implementation of military communication waveforms that is specifically intended to meet a subset of these objectives. Such Joint Tactical Radio Systems are available from Rockwell Collins, Inc. of Cedar Rapids, Iowa.

There is growing interest in applying an Open Standard SDR Architecture to commercial applications such as avionics communication, navigation and surveillance (CNS). The characteristics of commercial CNS waveforms are quite different from the military JTRS communication waveforms, and, in general, are less complex to implement. However, conventional SDRs use multiple moderate or wideband general purpose RF front ends. Each of these RF front ends is implemented with multiple filter banks. Each of the filter banks may be very costly relative to the overall cost of the system. Furthermore, CNS systems for transport aviation typically require large numbers of RF front ends to support operational requirements. Thus, it may result in an application of SDRs in transport aviation to be too costly to implement.

Accordingly, there is a need for SDR technology that allows a single set of hardware to perform multiple functions by software reconfiguration. Further, there is a need for reconfigurable SDR systems that use antenna specific RF front ends. Further still, there is a need for such a reconfigurable SDR system that is less costly to produce than conventional SDRs but provides similar functionality.

SUMMARY

What is provided is a method of providing a structure for a software defined radio (SDR). The method comprises providing a set of antennas. The method also comprises coupling an antenna switch to the set of antennas. The antenna switch comprises a set of filters. Each of the set of filters is associated with a specific radio application. The method also comprises coupling a set of RF front ends to the antenna switch. The RF front ends function as banded frequency converters.

What is also provided is a software defined radio (SDR). The software defined radio comprises a means for filtering RF signals. The means for filtering is incorporated into an antenna switch. A set of antennas is coupled to the antenna switch. The SDR also comprises a means for converting frequencies coupled to the antenna switch. The means for converting frequencies is banded over a frequency range.

Further, what is provided is a software defined radio. The software defined radio comprises a modem bank at least partially defined by software running on a processor. The SDR also comprises an antenna group translator coupled to the modem bank. Further, the SDR comprises at least one antenna coupled to the antenna group translator. The antenna group translator comprises an antenna switch comprising RF filtering functions and RF front ends comprising frequency conversion functions.

Alternative exemplary embodiments relate to other features and combination of features and combination of features as may be generally recited in the claims.

BRIEF DESCRIPTION OF THE DRAWINGS

A better understanding of the features and advantages of the present invention will be obtained by reference to the following detailed description that sets forth illustrative embodiments by way of example only, in which the principles of the invention are utilized, and the accompanying drawings, of which.

DETAILED DESCRIPTION

Figure 1:
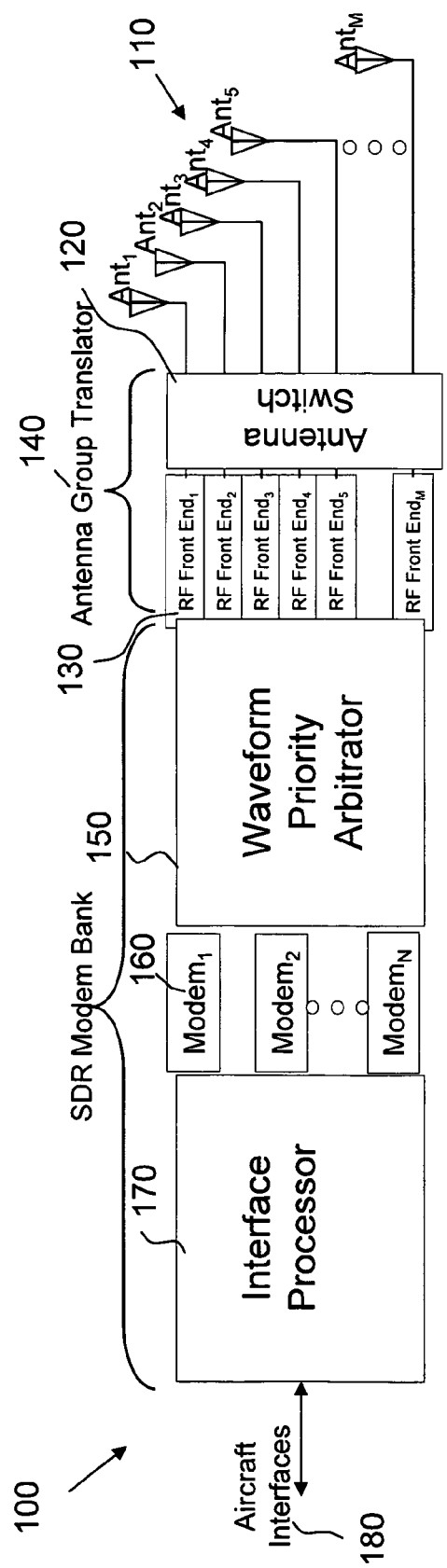
FIG. 1 is an exemplary block diagram of a software defined radio system in which the invention is embodied.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

A software defined radio (SDR) is characterized by software executing on microprocessors and configurations loaded into programmable hardware such as field programmable gate arrays (FPGAs). To facilitate software design, portability and interoperability, a Software Communications Architecture (SCA) may be used. The SCA specified for JTRS is one instantiation of an SCA that was specifically defined to provide an abstraction layer between SDR waveform application software and the underlying hardware platform. The elements of the JTRS SCA are a Portable Operating System Interface (POSIX), Common Object Request Broker Architecture (CORBA), and a set of services and utilities labeled Core Framework. Application of the SCA to radio communication systems insures interoperability and portability of these systems.

The platform abstraction provided by the SCA makes it possible to use a wide variety of microprocessors to host the SCA operating environment (OE). A basic requirement for the platform microprocessor is that it must provide sufficient computing performance to meet the real time requirements of the waveform being executed on the platform.

In accordance with an exemplary embodiment, the method and apparatus discussed may employ any kind of hardware to run the software embodying the invention, including but not limited to a personal computer, Rockwell Collins Advanced Architecture MicroProcessor (AAMP), ARM processor, XScale processor, Digital Signal Processor (DSP), Application Specific Integrated Circuit (ASIC) or programmable platform ASIC, FPGA, General Purpose Processor (GPP), microprocessor, mainframe or dedicated circuit with memory, so that in general any compatible piece of hardware or virtual machine can be configured to run the software disclosed.

Thus, an exemplary method and apparatus for constructing the invention is a computing platform running a software program, which may be written in any computer language (such as C, C++, Ada, Perl, Java or the like), preferably an Object Oriented programming (OOP) language, run by a computer system having an operating system. The computer system typically has one or more processors, primary and secondary memory cooperating with the processor(s), which executes instructions stored in the memory, I/O means, and any necessary specialized hardware or firmware. Depending on the language used to construct and implement the software tool, the source code, object code and/or executables of the tool may have any number of classes, functions, objects, variables, templates, lines of code, portions of code, components and constructs (collectively and generally, "a process step", "step", "block", "functional module" or "software module") to carry out the invention in successive stages as described and taught herein, and may be either a standalone software application, or employed inside of or called by another software application, or as firmware. The software process or software module may be constructed so that one portion of code in the application performs a plurality of functions, as for instance in Object Oriented programming (e.g., an overloaded process). The converse is also true, in that a plurality of portions of code could perform a plurality of functions, and still be functionally the same as a single portion of code. At any stage of the process of the invention, intermediate values, variables and data may be stored for later use by the program. In addition, the executable or source code data comprising the software of the invention may reside on computer readable storage medium (e.g., a magnetic disk, which may be portable, such as a hard drive, floppy drive; memory (e.g., flash RAM); or a DVD or CD-ROM disk).

FIG. 1 depicts the basic SDR elements used to construct a software defined radio that may be applied in an aircraft or other application. These elements include one or more processors, which may be Rockwell Collins Advanced Architecture MicroProcessor (AAMP), an ARM processor, an XScale processor, or a DSP, and any necessary associated memory. The processors are preferably of a kind that are scalable and low power.

In FIG. 1 an exemplary block diagram of an SDR 100 is depicted. SDR 100 comprises a set of antennas 110. Antennas 110 are coupled to an antenna switch 120, which is coupled to RF front end 130. An antenna group translator 140 is characterized by a set of RF front ends 130 and antenna switch 120. The antenna group translator 140 is coupled to a waveform priority arbitrator 150. Waveform priority arbitrator 150 is coupled to a set of modems 160 that are coupled to an interface processor 170. Interface processor 170 is further coupled to aircraft interfaces 180. The elements depicted are operatively connected to communicate with one another along communication lines. The antenna group translator 140 converts at least one analog signal into digital baseband data using either analog or digital signal processing methods, with programmable digital signal processing methods being the preferred approach for software defined radios. Antenna Group Translator 140 therefore provides RF up/down conversion in RF front end 130 and antenna switching in antenna switch 120. These fundamental building block elements are interconnected in a topology to provide scalability and increase performance. The functionality and behavior of each of the processing blocks in FIG. 1, is controlled by a software program associated with each particular building block. The software program may be stored with each particular building block, or it may be stored in a shared central storage area and loaded into each particular building block as needed, or it may be stored in multiple locations to enhance the reliability or improve the integrity of the radio system.

In accordance with an exemplary embodiment, radio system 100 may be used in a communication, navigation, and surveillance (CNS) application for an aircraft. Radio system 100 comprises an SDR which allows a single set of hardware to perform multiple functions by software reconfiguration. Alternatively, radio 100 may be used in other applications which may benefit from the reconfigurability of the radio node with regard to waveforms and other functionality. In SDR 100 modems 160 may be software based modems which provide reconfigurable modulation and demodulation functions. In CNS applications SDR 100 may be used for a variety of applications and associated waveforms including, but not limited to VHF (Very High Frequency) Omni-directional Radio-range (VOR), High Frequency (HF), Localizer (LOC), Glide Slope (GS), Marker Beacon (MB), VHF Communications (VHF COM), Satellite Communications (SATCOM), etc.

Because of the number and variety of signals being received and transmitted in a CNS system and because not all functions need to be used simultaneously, it is therefore beneficial to utilize a reconfigurable radio such as SDR 100. However, the reconfigurability creates a need for RF front ends which utilize multiple filter banks to span a moderate or wideband. Thus, SDR 100 may be configured with software functionality which uses available resources (at least one of the Interface Processor 170, Modems 160, Waveform Priority Arbitrator 150, RF front ends 130, Antenna Switch 120, and Antenna 110) to automatically and autonomously change the SDR application depending on current needs. In a conventional CNS SDR, banks of software based modems, connected to aircraft antennas 110 by Antenna Group Translator 140 are used to provide the required functionality. The ability to reconfigure SDR 100 allows modems and RF front ends to perform multiple functions. Antenna Group Translator 140 is required to perform both up/down conversion as well as antenna switching and routing. Conventionally RF front ends 130 are utilized to operate over a wide frequency range. RF front ends 130 (such as those found in JTRS systems) may include general purpose RF filters. Each RF front end 130 has filters that cover the entire band of operation.

Air transport CNS applications operate in well defined frequency bands and the applications to be used during different phases of flight are substantially predictable. In accordance with an exemplary embodiment, an architecture which reduces the number of filter banks may be used while maintaining required functionality of the SDR system. This reduction in filter banks may be accomplished by moving the costly filter bank components from the antenna switch. The RF filter banks which are specific to each potential application are put in the Antenna switch. By providing such a structural change, the RF front ends become generic up/down converters. The total number of RF filter banks which are required to maintain the required functionality are greatly reduced. Redundant and unused filter banks are not required because each antenna will have its own RF filter bank for the application related to the specific antenna.

Figure 2:
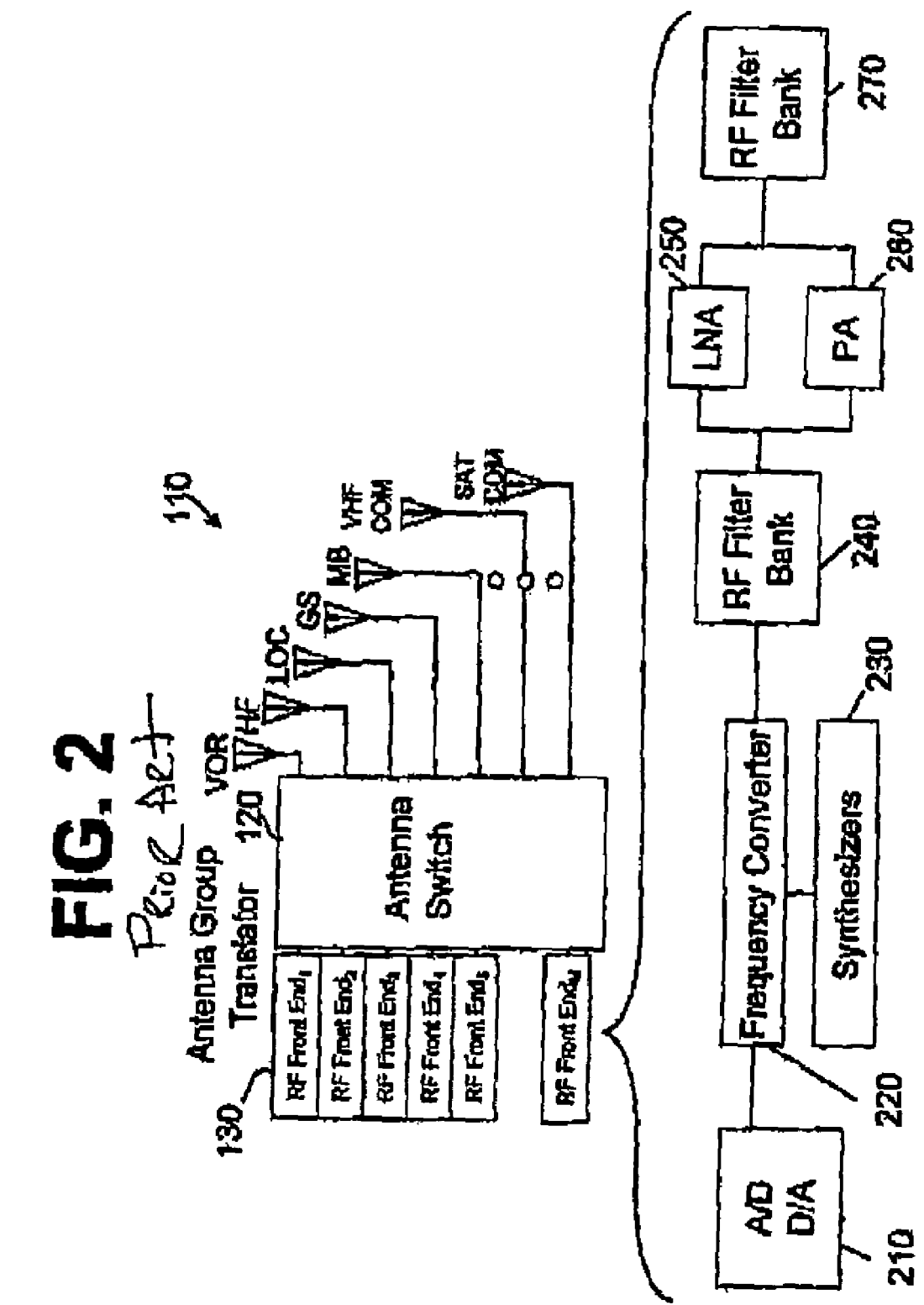
FIG. 2 is an exemplary block diagram of a conventional RF front end architecture for an SDR.

Referring now to FIG. 2, the architecture of a conventional RF front end is depicted. RF front end 130 is coupled to antenna switch 120 which is coupled to antennas 110. Each antenna 110 is associated with a specific application. Each RF front end 130 contains the entire radio (RF filter bank to digital). The RF filter bank provides full coverage for all signals of interest. The Antenna switch conventionally provides RF switching and routing between antennas 110 and RF front ends 130. In a conventional setup, RF front ends 130 each include an A/D D/A converter 210 coupled to a frequency converter 220 and synthesizer 230, an RF filter bank 240, a low-noise amplifier (LNA) 250 and a power amplifier (PA) 260, and an RF filter bank 270. Thus, in a conventional system there are excess RF filters in the system. For example, each RF front end contains a marker beacon (MB) receiver preselector, but there is only one MB antenna and therefore only one MB receiver preselector will ever be used at one time.

Figure 3:
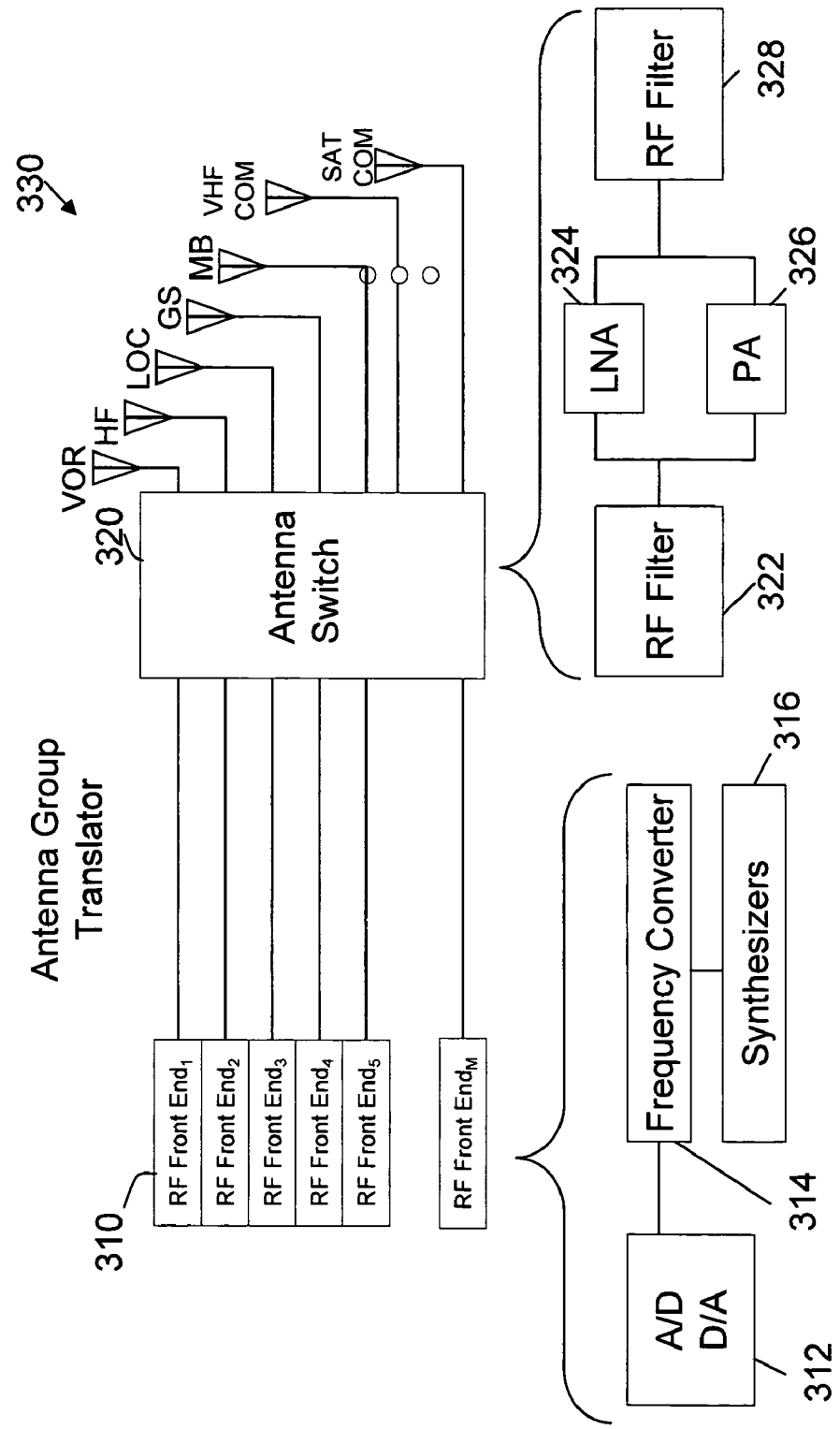
FIG. 3 is an exemplary block diagram of an exemplary front end architecture for an SDR according to an exemplary embodiment.

Referring now to FIG. 3, an architecture of an RF front end 310 and Antenna switch 320 coupled to a set of antennas 330 is depicted. In the exemplary embodiment depicted, each of the RF front ends 310 comprises frequency translation only without the inclusion of the primary filtering functions. The frequency translation comprises an analog to digital (A/D) and digital to analog (D/A) converter 312, a frequency converter 314, one or more synthesizers 316. Each of these frequency translators is repeated in each RF front end 310. Frequency translators are configured to provide conversion of the analog RF signal to a digital signal for reception or provide conversion of the digital signal to analog RF for transmission. Antenna switch 320 is depicted comprising the RF filtering bank including RF filters for the specific SDR applications supported. Antenna switch 320 comprises an input RF filter 322, an LNA 324, a PA 326, and an output RF filter 328. Antenna 330 specific functions are associated with each antenna. For example, the MB selector will only connect to the MB antenna. In the exemplary embodiment depicted, the filters and amplifiers necessary for the SDR functions, are on the antenna side of the switching matrix with only one filter and amplifier structure being required for each antenna.

By providing the structure of FIG. 3 or alternative structures having generally similar characteristics, a large number of filter banks is eliminated. Each antenna may comprise only the minimum filtering required associated with it and may therefore not be a filter bank covering a large number of applications and frequencies. By associating the RF filters with their respective antennas, the total number of filters, necessary to carry out all of the applications associated with the SDR, is greatly reduced. In this configuration, RF front ends 310 become banded frequency converters with intermediate frequency (IF) filtering and automatic gain control (AGC).

As an example of the hardware savings provided by the exemplary embodiments shown and described, Table 1 depicts radio requirements for a typical HF-UHF CN functions. In such a situation, the requirements would be 9 SDR radios versus 14 conventional (federated) radios. In such a situation, Table I shows that the total number of filters required in the exemplary embodiments depicted with antenna specific front ends would be a total of 18 filters compared with 54 filters for a conventional SDR with conventional RF front end and compared with 22 filters required in conventional federated radios.

TABLE I

| Front End Component | SDR Front End | | |
|---|---|---|---|
| | Federated | Conventional | Antenna Specific Front Ends |
| HF Preselector | 1 | 9 | 1 |
| VHF-NAV Preselector | 5 | 9 | 4 |
| VHF-COM Preselctor | 4 | 9 | 3 |
| MB Preselector | 1 | 9 | 1 |
| UHF Preselector | 3 | 9 | 3 |
| FM Immunity Filter | 8 | 9 | 6 |
| Total Filters | 22 | 54 | 18 |

While the detailed drawings, specific examples, and particular formulations given described exemplary embodiments, they serve the purpose of illustration only. It should be understood that various alternatives to the embodiments of the invention described maybe employed in practicing the invention. It is intended that the following claims define the scope of the invention and that structures within the scope of these claims and their equivalents be covered thereby. The hardware and software configurations shown and described may differ depending on the chosen performance characteristics and physical characteristics of the computing and analysis devices. For example, the type of computing device, communications bus, or processor used may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

The invention claimed is:

1. A method of providing a structure for software defined radio (SDR), the method comprising:
providing a set of antennas;
coupling an antenna switch circuit to the set of antennas, the antenna switch circuit comprising a plurality of terminals, each of the terminals being coupled to a respective antenna of the antennas and a respective RF bank of a plurality of RF banks, the respective RF bank being associated with the respective antenna, each of the RF banks including an input filter, an output filter, a low noise amplifier and a power amplifier, each of the antennas being associated with at least one of a specific radio application;
coupling a set of RF front ends to the antenna switch circuit, the RF front ends functioning as banded frequency converters, the RF front ends being configurable for each of the radio applications, wherein an antenna switch in the antenna switch circuit is capable of coupling any of the RF front ends to any of the RF banks; and
connecting via the antenna switch circuit one of the RF banks associated with one of the antennas to one of the RF front ends configured for one of the radio applications, the one of the radio applications being associated with the one of the antennas.

2. The method of claim 1, wherein the input and output filters of the RF banks of the antenna switch comprise RF filters.

3. The method of claim 1, wherein the RF front ends each consist essentially of a frequency converter, a D/A converter, an A/D converter, and at least one synthesizer.

4. The method of claim 1, wherein the RF banks do not perform frequency translation.

5. The method of claim 1, wherein the SDR is part of a communication, navigation and surveillance (CNS) System.

6. The method of claim 1, wherein the SDR is an avionics SDR.

7. The method of claim 1, wherein the SDR is a ground-based military radio.

8. A software defined radio (SDR) comprising:
a means for filtering RF signals, the means for filtering being incorporated into an antenna switch;
a set of antennas coupled to the antenna switch; and
a means for converting frequencies coupled to the antenna switch, the means for converting frequencies including a front end being banded over a frequency range, wherein each frequency range is associated with a radio application of a plurality of radio applications, wherein each of the antennas is associated with at least one of the radio applications, wherein the means for filtering includes a set of filters, the filters being associated with a specific antenna of the antennas, wherein the antenna switch couples a selected front end of the front ends to a selected filter of the filters, the front ends functioning as banded frequency converters for at least one of the radio applications, wherein the selected front end is associated with a first application of the radio applications and the selected filter is associated with one of the antennas associated with the first application, wherein the antenna switch is capable of coupling any of the front ends to any of the filters.

9. The SDR of claim 8, wherein the means for filtering comprises an RF filter, wherein the front ends do not perform primary filtering.

10. The SDR of claim 8, wherein the means for filtering comprises a low-noise amplifier (LNA).

11. The SDR of claim 8, wherein the means for filtering comprises a power amplifier (PA).

12. The SDR of claim 8, wherein the SDR is part of a communication, navigation and surveillance (CNS) System.

13. The SDR of claim 8, wherein the SDR is an avionics SDR.

14. The SDR of claim 8, wherein the SDR is a ground-based military radio.

15. A software defined radio, comprising:
a modem bank at least partially defined by software running on a processor;
an antenna group translator coupled to the modem bank; and
a set of antennas coupled to the antenna group translator,
wherein the antenna group translator comprises an antenna switch comprising a set of filters and RF front ends, each of the set of filters being associated with a respective antenna in the set of antennas, each of the antennas being associated with at least one of specific radio applications, wherein the antenna switch bidirectionally couples a selected RF front end of the RF front ends to a selected filter of the filters, the RF front ends functioning as banded frequency converters for at least one of the specific radio applications, wherein the RF selected front end is associated with a first application of the specific radio applications and the selected filter is associated with one of the antennas associated with the first application of the radio applications.

16. The software defined radio of claim 15, wherein the antenna switch comprises a power amplifier (PA).

17. The software defined radio of claim 15, wherein the antenna switch comprises a low-noise amplifier.

18. The software defined radio of claim 15, wherein the software defined radio is configured to carry out communication, navigation, and surveillance.

19. The software defined radio of claim 15, wherein the functions of the software defined radio are changed according to the flight phase.

20. The software defined radio of claim 15, wherein the RF front ends are banded specifically according to a specific software defined radio function.

* * * * *